May 5, 1942.  R. B. McCOPPIN  2,281,849
ROTATABLE RACK
Filed Oct. 2, 1940
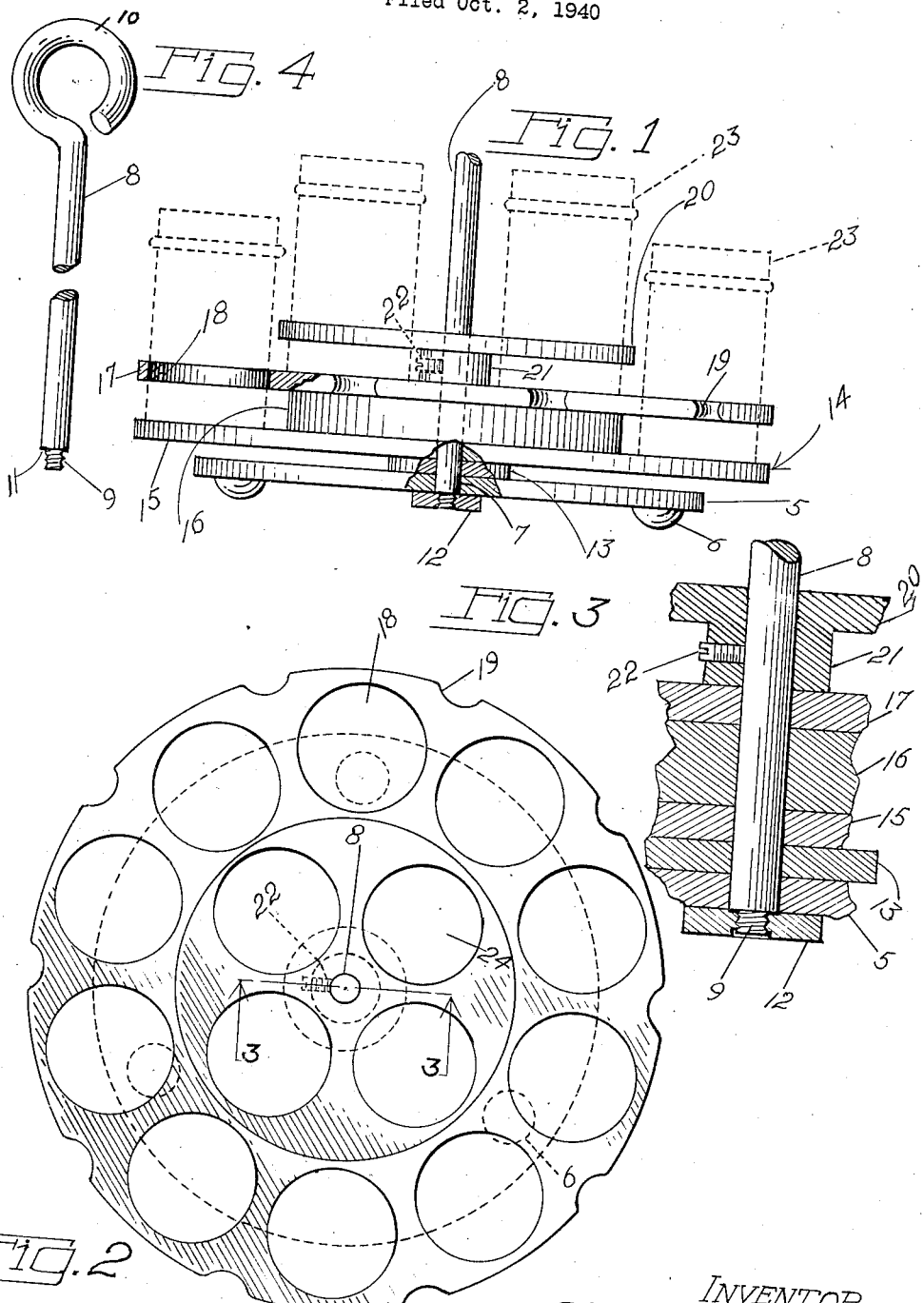
INVENTOR
Richard B. McCoppin
ATTORNEY Patented May 5, 1942

2,281,849

UNITED STATES PATENT OFFICE 2,281,849

ROTATABLE RACK

Richard B. McCoppin, Westchester, Ill.

Application October 2, 1940, Serial No. 359,349

1 Claim. (Cl. 211—74)

This invention relates to a novel and improved rotatable rack and support for containers in which condiments and spices are packaged, and it is the principal object of my invention to provide a device of this character allowing the user to select and readily remove from the device the container desired for use.

Another object of my invention is to provide a device which has dual and independently rotatable container holding means and in which means a number of condiment containers are removably held.

Another object of my invention is to provide such a device for holding in compact form and making readily and instantly available a desired condiment or spice container in such a manner, that any container in the said holder may be brought to view and easily and readily removed from the holder for actual use in the kitchen or for any culinary purposes.

A further object of my invention is to provide a device of the character heretofore mentioned which is neat in appearance, simple in construction, practical and efficient in operation, and economical to manufacture in quantity production.

Other objects and advantages of my invention will become more fully apparent as the description thereof proceeds, and will then be specifically defined in the appended claim. In the accompanying drawing like symbols will be used to designate like parts and in which the views forming a material part of this disclosure are:

Fig. 1 is a front elevational view of my device showing portions in section in order to better elucidate the nature and utility of my invention.

Fig. 2 is a top view looking in a downward direction on Figure 1.

Fig. 3 is an enlarged fragmentary longitudinal cross-sectional view on the line 3—3 of Figure 2.

Fig. 4 is a detailed view of one of the elements of my invention.

Referring to the drawing, Figure 1, the base of my device is designated 5 and it is preferably supplied with three or more rubber feet 6 which may be attached by gluing to the base or otherwise securing to the base in any common manner.

The base is provided with a hole 7, which is for the purpose of mounting therein the handle member 8, having a shoulder portion 11, and a reduced threaded shank portion 9 which is secured to the base by virtue of the washer element 12 suitably threaded for the purpose.

The handle member 8 is of sufficient length in order to permit grasping the loop member 10 thereof when it is desired to carry the entire device from place to place. Upon the base member 5 is mounted the spacer element 13 which may be made of any suitable material having a suitable recess in order to accommodate the rod extension 8 of the handle member.

Upon the spacer member 13 is mounted a primary container holding member generally designated 14 which is made up of platforms 15 and 17 and a spacer element 16. The top platform member 17 is provided with a multiple number of recesses 18 which are large enough to accommodate a number of containers designated 23, these openings being slightly larger than the base of the said containers so that they may easily be placed therein and removed therefrom.

The bases of the containers 23 rest on the upper surface of the platform 15 as indicated in the drawing. The reel member has a recess or hole which fits on the handle 8 in a manner so that it may be easily rotated thereupon by virtue of placing the index or other finger in one of the notches 19 so as to bring to view any one of the containers 23 when it is desired to remove it from the holder for actual use.

Upon the disc 17 of the member 14, is mounted a disc member designated 20, having a hub portion 21 integrally mounted thereon; this hub portion being secured to the handle member 8 by virtue of set screw 22, so that when the handle member 8 is grasped by the loop portion 10 and rotated, it will rotate with it the member 20. This member 20 also has a number of recesses 24 made up of suitable size to accommodate readily a multiple number of containers 23. The member 20 together with the disc member 19 in assembly thus furnish a secondary rotatable container holder. The containers may be filled with such condiments and spices as are used for culinary purposes.

The function and utility of my device are obvious and readily apparent, however, to elucidate further, it might be said that the device may be carried about and placed upon any desired and convenient support by grasping the loop member 10 of the handle 8 and carrying the same, whence it may be placed on any suitable support or table in a kitchen.

When it is desired to remove a certain container 23 which is held within the confines of a recess 18 in the primary rotatable container holding member 14, the said member is rotated by indexing the notches 19 as heretofore explained until the desired container is brought to view, whence it is removed therefrom and utilized and later replaced when no longer needed.

When it is desired to remove one of the containers 23 mounted within the carriage 20, the desired container may be brought to view by grasping the loop member 10 and rotating the same. By virtue of set screw 22, the flange member will rotate with the handle member 8, and hence bring about the rotation of the containers 23 mounted therein in its openings 24. The container may be readily removed and replaced as heretofore explained. Thus it is readily obvious that the primary rotatable container holding member and the secondary rotatable container holding member are adapted to be independently indexed to position.

When the device is not needed it may be carried to a convenient place and put away for future use.

I believe I have described succinctly the nature of the structure and operation of my invention, and although I have shown a preferred form thereof, the manner of construction may be varied. The item as indicated may be made up of wood, fiber, hard rubber, or any other suitable material, or if desired, may be made of metal in casting or stamping form.

Although I have shown a general arrangement elucidating the features of my invention, it is to be understood that the form shown is merely exemplary, and that I reserve the right to all alterations, modifications and improvements which come within the scope and spirit of my invention, and the purview of the accompanying drawing and the foregoing description; my invention being limited only by the appended claim.

Having thus described and revealed my invention what I claim as novel and desire to secure by Letters Patent is:

A device of the character described comprising, a base member, a handle member rotatably mounted therein, a washer member mounted on said handle member resting on said base member, a disc member rotatably mounted on said handle member and resting on said washer member, a bushing member rotatably mounted on said handle member resting on said disc member, a second disc member rotatably mounted on said handle member resting on the said bushing member, the said second disc member being provided with a number of openings adapted to hold removably a series of containers, a third disc member having a hub portion rigidly secured to said handle member adjacent the said second disc member, the said third disc member provided with a number of openings adapted to hold removably a second series of containers, the said second series of containers being confined within a circumference drawn tangentially to that portion of the bodies of said first series of containers nearest the geometric center of the said device.

RICHARD B. McCOPPIN.